UNITED STATES PATENT OFFICE.

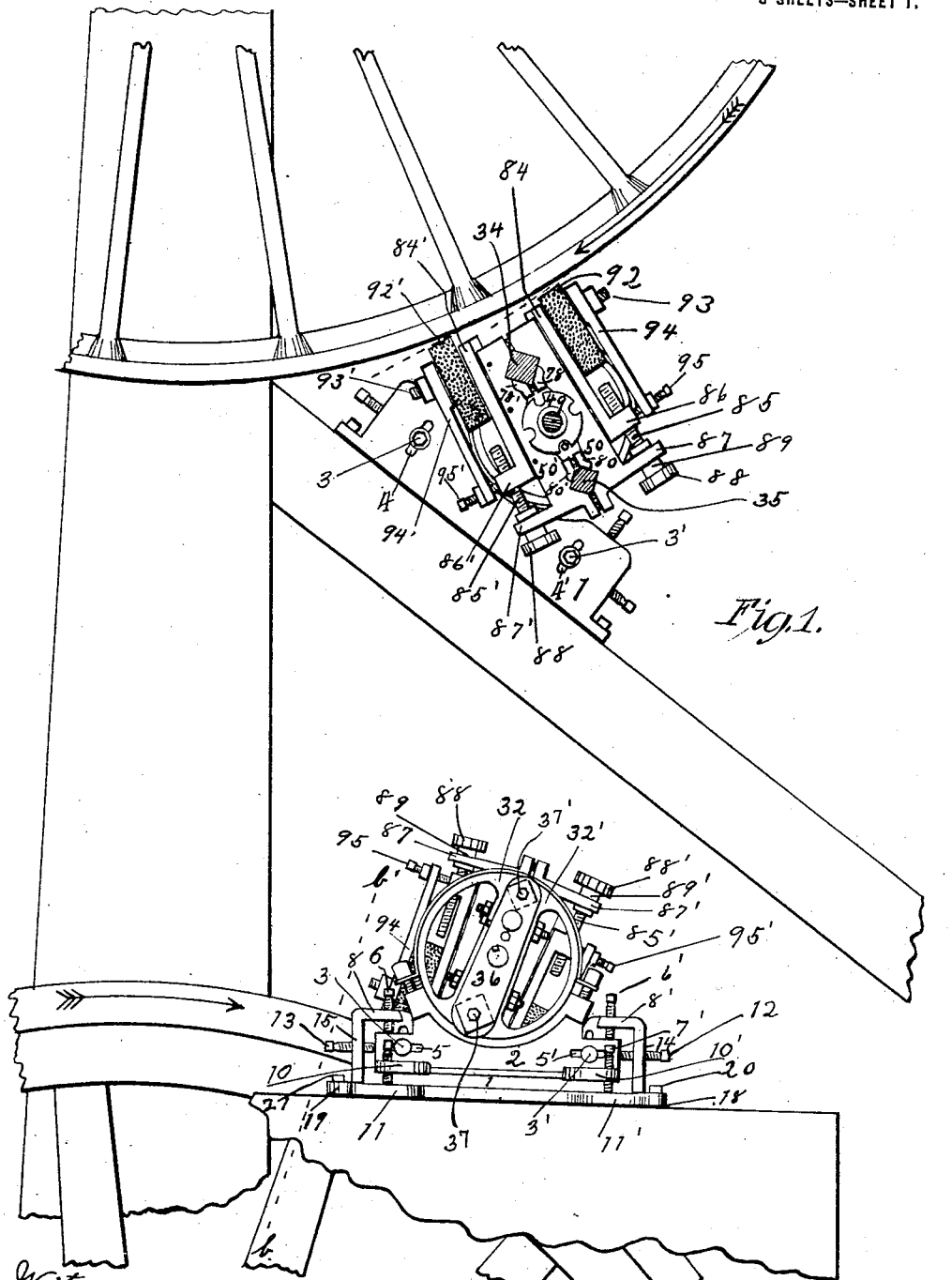

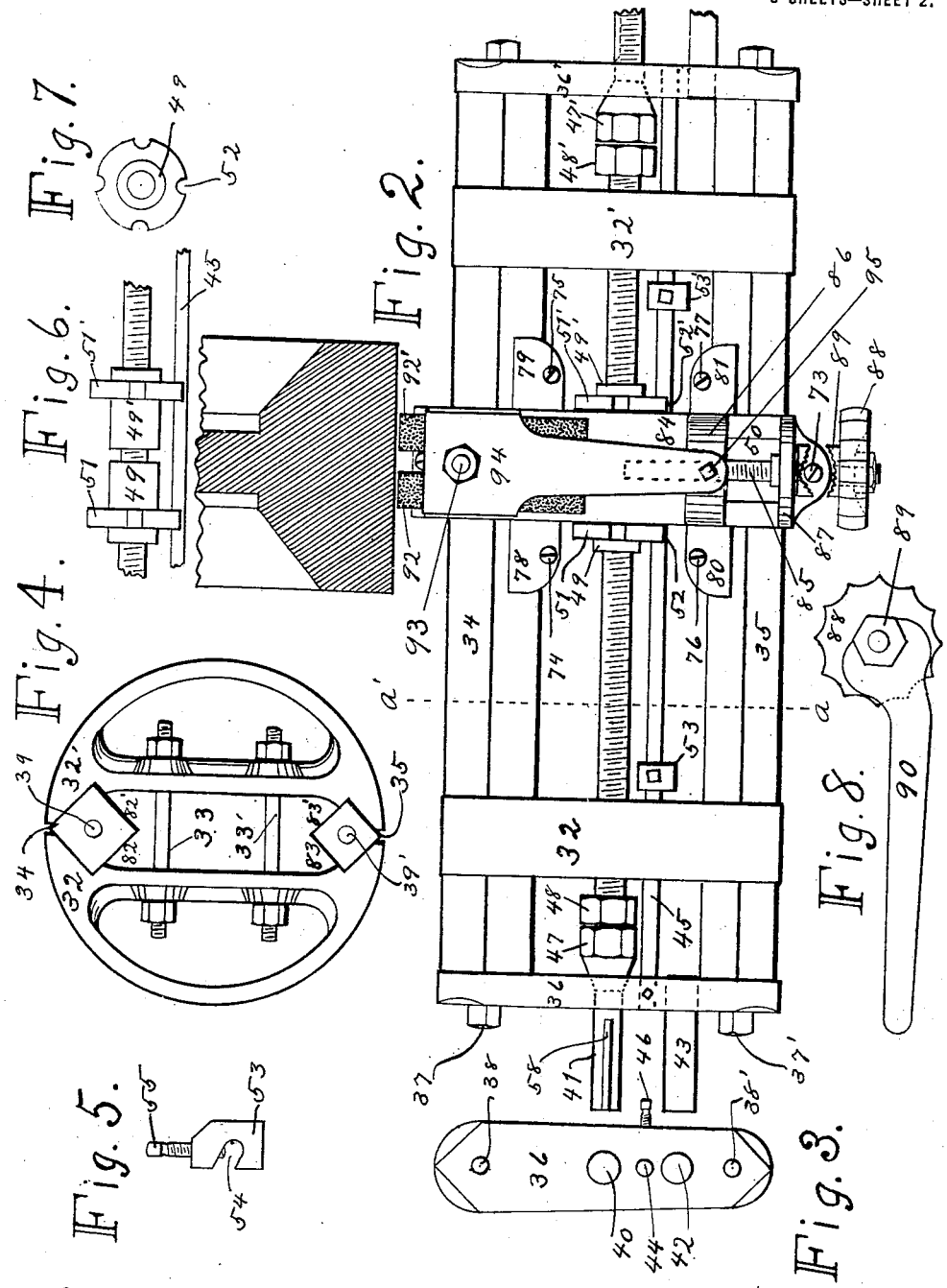

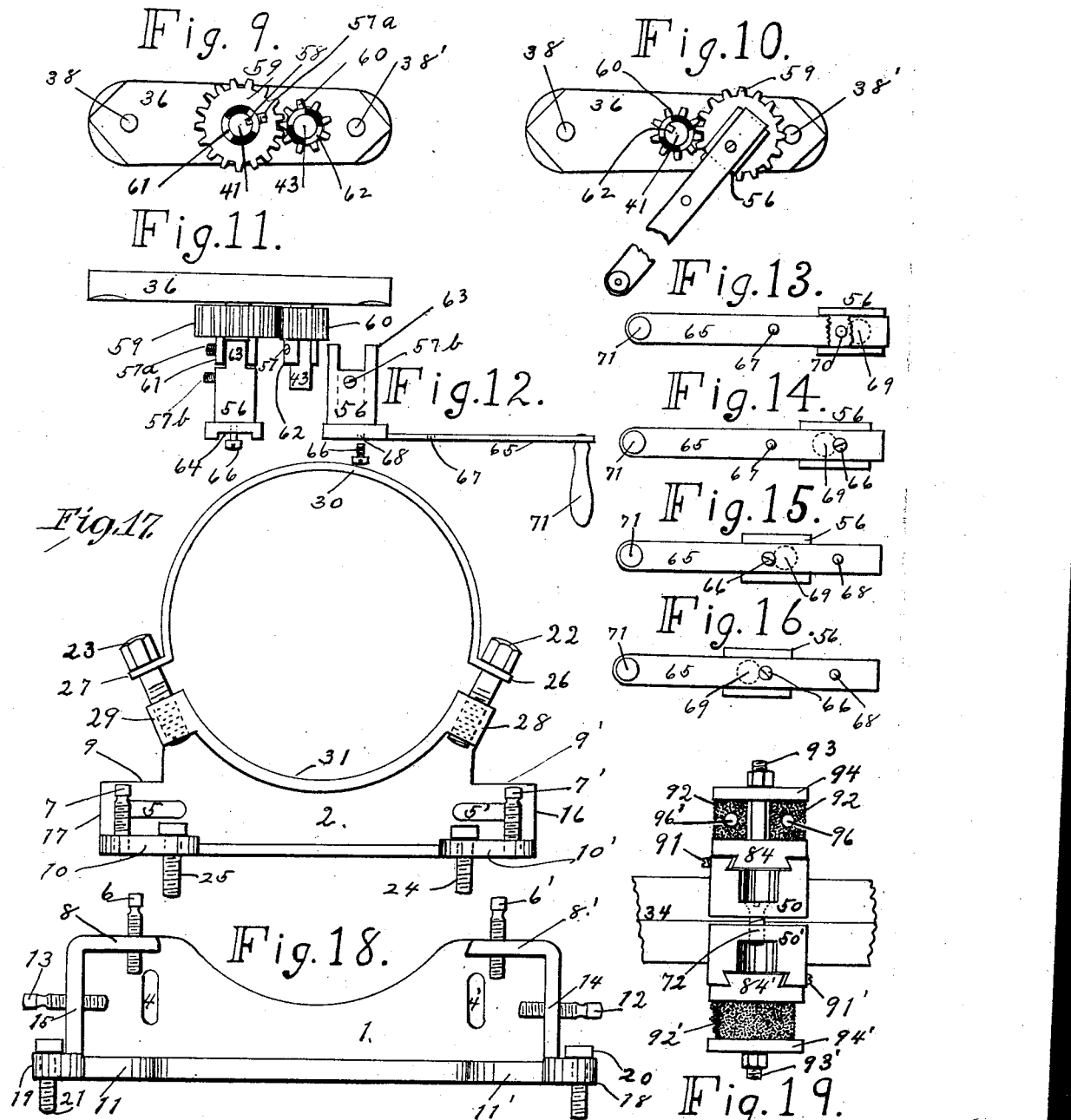

WILLIAM RICHARD ANTHONY, OF MEMPHIS, TENNESSEE.

MACHINE FOR TRUING FACED WHEELS OR PULLEYS.

1,250,939.  Specification of Letters Patent.  Patented Dec. 25, 1917.

Application filed February 14, 1917. Serial No. 148,693.

*To all whom it may concern:*

Be it known that I, WILLIAM RICHARD ANTHONY, residing at Memphis, county of Shelby, State of Tennessee, have invented certain new and useful Improvements in Machines for Truing Faced Wheels or Pulleys, the principles of which are herein set forth.

The object of this invention is to provide a more efficient means for truing the worn faces of band saw mill wheels and of other similar wheels or pulleys. It embodies improvements upon that forming the subject matter of my Patent No. 1,148,563, being faster, more accurate, safer and more complete in its adjustments.

Referring to the accompanying three sheets of drawings, which are made a part hereof, and on which similar reference characters indicate corresponding parts, Figure 1 represents a portion of a band saw mill with this truing machine set in working position to the bottom wheel and to the top wheel, the bottom wheel setting being a view in elevation of the near end of my machine, and the top wheel setting here showing the opposite end of my machine on line *a—a'* of Fig. 2; Fig. 2 is a top plan view of the main body of my machine, shown in working position to a portion of a wheel rim on sectional line *b—b'* of Fig. 1; Fig. 3 is a view in detail from the end elevation of Figs. 1 and 2, showing the cross connecting bar; Fig. 4 is a view in detail of an end elevation of a twin member, removable end supporting ring, showing it clamped upon two slide bars, as in Fig. 1, a top plan of which is shown in Fig. 2; Fig. 5 is a view in elevation, from end of machine, of the detail construction of a stop block, also shown in Fig. 2; Fig. 6 is a detail view of a side elevation of a pair of feed nuts, also shown in working position in Figs. 1 and 2; Fig. 7 is a detail end elevation of feed nuts shown in Fig. 6; Fig. 8 is a side elevation of a hand wheel, also represented in Figs. 1 and 2, here showing its construction for use with a wrench; Figs. 9, 10 and 11 show the cross bar, as of Fig. 3, and show in detail the construction of two cog gears and an extensible crank for turning the longitudinal feed screw shown in Fig. 2; Figs. 12, 13, 14, 15 and 16 show in detail the construction by which the crank is made extensible; Figs. 17 and 18 show in detail the construction of the two members of the end supporting bracket, also shown in Fig. 1; Fig. 19 is a view of side elevation of a portion of machine showing the detail construction of the operative end of the twin carriages, representing the relative positions of their members, the two principal ways of holding the scraping stones, also the hollow centers of the scrapers herein employed, other positions of these twin carriages being shown in Figs. 1 and 2.

While this machine, like that of my former Patent No. 1,148,563, may be set to operate successfully in many different positions, and may be attached either to the iron frame of a band mill or to false timbers in many different ways, the positions here shown in Fig. 1 are thoroughly practical and very favorable to the inventor, it being screwed to the iron husk, or frame of mill, for use at the lower wheel, and for use at the upper wheel it is screwed to oblique timbers extending from the floor to the upright frame of the mill, both ends of the machine having their brackets secured to the foundation solidly.

The brackets, or end supporting attachments, of this machine, as shown in Figs. 1, 17 and 18, are alike at each end of machine, each being composed of two members substantially strong and securely held together with means of release and screw adjustments in order to make the proper shift of one with relation to the other in order to provide the necessary alinement of the machine to the band wheel.

As shown in Figs. 1, 17 and 18, the bracket foot 2 is provided to be clamped into the shoe 1 by bolts 3—3' passing through the vertical slots 4—4' of the shoe 1 and through the horizontal slots 5—5' of the foot 2.

The foot 2 may be raised with relation to the shoe 1 by first loosening bolts 3 and 3', then by backing the set screws 6 and 6', which are threaded into parts 8 and 8' of the shoe 1 and press against the parts 9 and 9' of the foot 2, and by tightening the set screws 7 and 7', which are threaded into parts 10 and 10' of the foot 2 and press against the parts 11 and 11' of the shoe 1, raising the foot 2 to the desired adjustment.

Then, in order to effect a lateral adjustment of the machine, the foot 2 may be moved either to the right or to the left by simply backing one of the set screws 12 or 13 and tightening the other, the screw 12 being threaded into the part 14 of shoe 1 and pressed against the part 16 of foot 2, and the screw 13 being threaded into the part 15 of shoe 1 and pressed against the part 17 of the foot 2. After the desired adjustment of these two members is obtained the two bolts 3 and 3' may be tightened.

In order to fasten the shoe 1 to its foundation, the lugs 18 and 19 are provided with holes through which the screws or bolts 20 and 21 may pass.

In cases when the bracket must be fastened where there is not room enough for the bracket shoe 1, often the bracket foot may be bolted direct to the foundation by removing the shoe and, as shown in Fig. 17, the bolts 24 and 25 pass freely through their holes in the projections 10 and 10' of the foot 2. In this case there is still a vertical adjustment by means of the set screws 7 and 7' being screwed down against some hard surface upon the foundation while the bolts 24 and 25 hold down against the lift of the set screws. Then, if only one bracket has been thus separated, the other bracket may still afford the necessary lateral adjustment effected by set screws 12 and 13.

In order to obtain the correct position of the machine with regard to the band wheel to be trued, and to allow the brackets to be fastened to their foundations in whatever position may be necessary, a rotary adjustment of the body of the machine is obtained within the brackets by means of the end rings, shown in Figs. 1 and 4, being clamped securely against the concave part 31 of the foot 2 by means of the clamp bands 30 through which the screws 22 and 23 pass near the extremities 26 and 27, these screws being threaded into the parts 28 and 29 of foot 2.

In order that these brackets may be set to accommodate mills of different width, requiring the brackets to be farther apart in some cases and closer together in others, these twin member end supporting rings, represented in Figs. 1, 2 and 4, but best shown in Fig. 4, are constructed in pairs of semi-circular members 32 and 32' provided with clamp bolts 33 and 33' and fitted to be clamped slidably in any place required upon the slide bars 34 and 35, Figs. 1, 2 and 4. Thus the brackets may be secured to their foundations at whatever distance apart the case may require, and yet the end supporting rings may be fastened upon the slide bars the same distance apart so that they may be clamped properly against the brackets by the clamp bands, as above explained.

These slide bars 34 and 35, preferably square, are parallel to each other, and are joined at each end by the cross connecting bars 36 and 36', Figs. 1, 2, 3, 9, 10 and 11, being secured to the ends of the slide bars 34 and 35 in any practical way, but preferably by the screws 37 and 37', Figs. 1 and 2, passing through the holes 38 and 38', Figs. 3, 9 and 10, and being threaded into the holes 39 and 39', Fig. 4, in the center of each end of the slide bars 34 and 35.

The cross connecting bar 36, of Figs. 2 and 3, is constructed with a hole 40 to receive the revoluble feed screw 41, a hole 42 into which is fastened the stud 43, a hole 44 to receive the rod 45, and a set screw 46 to hold rod 45 into position. The rod 45 may also be threaded into hole 44 if desired.

The feed screw 41 is provided with conical collars 47 and 47' threaded thereon and jam nuts 48 and 48' to hold said collars in position, also a pair of twin feed nuts 49 and 49', Figs. 1, 2, 6 and 7, which together control the longitudinal travel of the twin carriages 50 and 50', Figs. 1, 2 and 19.

Each of these twin feed nuts 49 and 49' has a flange 51 to press against the sides of the carriages between which the feed screw 41 and part of the feed nuts 49 and 49' operate. These feed nuts are not rigidly secured to the carriages, but are adjustable to press the sides just enough to control their travel without affecting their accuracy, even in case the feed screw should not run perfectly true from not being exactly straight.

These twin feed nuts 49 and 49' may be turned upon the feed screw 41 so as to determine the desired distance apart, then they may be held from further turning by any simple method, but must be held in the same relative position toward each other, after being set, until further adjustment is necessary from wear or other causes.

In order to provide adjustable stop blocks to limit the travel of the carriage reliably where desired, and also to hold both feed nuts in position, the rod 45 is attached as herein shown parallel and closely adjacent to the feed screw 41, and the feed nuts 49 and 49' are provided with a succession of notches 52, Figs. 2 and 7, which are turned so as to permit the rod 45 to pass freely through the notch 52 and 52', Fig. 2, of each feed nut flange 51 and 51'. This rod 45 carries two stop blocks 53 and 53', which may be set as desired, and which stop the travel of the carriage by pressing against the flanges 51 and 51' of the feed nuts, instead of pressing directly against the sides of the twin carriages, thereby preventing all cause for throwing the carriages in a side strain when the stop blocks are struck. These stop blocks are each provided with a slot 54 and set screw 55, Fig. 5, so that either or both stop blocks may be engaged or removed at will by simply using the set screw 55 for this purpose, the slot being set diagonally so that, when hooked over the rod 45, the set screw 55 will hold the stop block in place.

The longitudinal feed screw 41 is turned, either directly or indirectly, by a handle crank shown in Fig. 12. If turned by the crank directly, the crank sleeve 56, Fig. 12, is slipped over the feed screw 41, Fig. 2, and the key seat 58 is engaged by the set screw 57$^b$ of the sleeve 56, Fig. 12. If desired a key may be used instead of the set screw 57$^b$.

In order to turn the feed screw 41 indirectly by the crank, a pair of cog gears 59 and 60 Figs. 9, 10 and 11, is provided, one to engage the end of feed screw 41 and the other to turn upon the stud 43, one gear being larger than the other, and both being provided with clutch connections 61 and 62, Figs. 9 and 11, to engage the corresponding clutch connection 63 of the crank sleeve 56, Figs. 11 and 12. This arrangement is applicable to either end of the feed screw 41 the machine being so constructed that this means of turning the feed screw is interchangeable. When it is desired to turn the feed screw 41 faster than the operator wishes to turn the crank, the larger cog gear 59 is placed upon the stud 43 with its clutch engaged to that of the crank sleeve 56, and the smaller cog gear 60 is placed upon the feed screw 41; but when it is desired to turn the feed screw 41 slower than the crank, the converse arrangement is employed, as shown in Fig. 9, and the set screw 57$^a$ of the cog gear 59 is then engaged with key seat 58, the clutch 62 of the small gear being engaged by the clutch 63 of the crank sleeve.

From Figs. 12, 13, 14, 15 and 16 it may be seen that the crank herein employed is extensible so as to give longer or shorter leverage as desired. At one end of crank sleeve 56, Fig. 11, is a groove 64 into which is held the crank lever 65, Figs. 12, 13, 14, 15 and 16, by the screw 66 passing through either hole 67 or 68, it being threaded into the hole 70 of crank sleeve 56, Fig. 13. In Figs. 14, 15 and 16, what is shown as hole 70 in Fig. 13, is shown to contain the screw 66, which screw 66 also occupies in Fig. 14 what is shown in Figs. 15 and 16 as hole 68, and in Figs. 15 and 16 screw 66 is shown to occupy what is shown in Figs. 13 and 14 as hole 67. By this construction twice as many variations in the length of leverage may be had as there are holes in the lever 65 through which the screw 66 may work, the distance between centers of these holes to be twice the distance from centers of holes 69 and 70 in the crank sleeve 56, Fig. 13.

For demonstration, suppose that the distance from centers of holes 67 and 68 is 2½ inches from centers of holes 69 and 70 is ⅝ inch, and from center of hole 67 to center of handle 71 is 5 inches. With the arrangement of Fig. 13, hole 69 is farther from handle 71 than is the hole 70 (into which the screw 66 fits, passing also through hole elsewhere shown as 68). Then from center of handle 71 to center of hole 69 is (5 inches plus 2½ inches plus ⅝ inch) or 8⅛ inches, the swing or leverage of handle 71. Then, as shown in Fig. 14, with hole 69 nearer to handle 71 than is screw 66 (which is identical in position with hole 70 of Fig. 13), from center of handle 71 to center of hole 69 is (5 inches plus 2½ inches minus ⅝ inch) or 6⅞ inches, swing of handle. Then, as shown in Fig. 15, with hole 69 farther from handle 71 than is screw 66 (which passes through hole 67 into hole 70, all identical in position here, see Fig. 13) the distance from center of handle 71 to center of hole 69 is (5 inches plus ⅝ inch) or 5⅝ inches. And, as shown in Fig. 16, with hole 69 nearer to handle 71 than is screw 66, the distance from center of handle 71 to center of hole 69 is (5 inches minus ⅝ inch) or 4⅜ inches. Thus we see that with this arrangement four different lengths of swing, of equal variations, are obtained from two holes in the handle lever, or twice as many lengths of swing as there are holes for extension in the crank lever.

The twin carriages of this machine are so arranged as to comprise two separate and independently operating carriages, one on each side of the slide bars, and each holding scraping stones so that either or both may be used as desired, to cut independently of each other.

Each of the twin carriages comprises a carriage base 50 and 50′, Figs. 1, 2 and 19, which are joined to support each other upon the slide bars 34 and 35 by screws 72 (Fig. 19), 73 (Fig. 2), at opposite ends of said carriages, and 74, 75, 76 and 77 in the four widened projections 78, 79, 80 and 81, Fig. 2. These widened projections of each carriage base join, as shown at 78, 78′, 80 and 80′, Fig. 1, each pair forming a V shaped guide to work against the inner corners of the slide bars 34 and 35, thus giving a broad bearing to guide the carriages in true line. Referring to Figs. 1, 2 and 4 it may be seen that the end rings, as shown at Fig. 4, are so constructed that the spaces 82, 82′, 83 and 83′ are sufficient to allow the carriage projections 78, 79, 80 and 81 to work freely into this space allowing the main body of the twin carriages to travel close up to the end rings at either end, thus economizing space, shortening the machine, and contributing rigidity.

In the twin carriages, the bases 50 and 50′ are fitted with the cross feed carriages 84 and 84′ which are fed toward and from the band wheel by screws 85 and 85′, being threaded into the right angle projections 86 and 86′ at ends of the cross feed member, and passing freely through the right angle projections 87 and 87′ of the bases 50 and 50′, these screws being turned by the hand wheels 88 and 88′ which are provided with multilateral shanks 89 and 89′ to be turned by a wrench 90, Fig. 8, to permit the cross carriages being gibbed tight by the gib screws 91 and 91′, Fig. 19, to keep out all possible slack and thus prevent chatter.

Upon these cross carriages 84 and 84′ the scraping stones 92 and 92′, Figs. 1, 2 and 19, are clamped by the stud bolts 93 and 93′ passing through the clamp plates 94 and 94′, which clamp plates project back over part 86 and engage with it by the screws 95 and 95′ to adjust the plates 94 and 94′ parallel with the cross carriages 84 and 84′.

These scraping stones 92 and 92′ are made hollow, the holes 96 in each being centrally located and extend their full length. This hollow center is provided so that the space therein conveys away the heat from friction, and, when the end corners are engaged with the band wheel, as shown in Fig. 1, when one corner is worn away, the scraping stones may be turned however is necessary to use the most unworn cutting corners without the center of the stone wearing to a point. As shown at 92′ in Fig. 19, the side corner of a stone may be used when necessary, and when clamped in this position the screw 95 or 95′ supports the clamp plate 94 or 94′ in a parallel position with the cross carriage 84 or 84′.

With the principle of this machine thus explained, in the use of same simply employment of the adjustments is necessary in order to obtain the required alinement, being sure to set it so that both pairs of scraping stones scrape with the corner, and not rub with the flat end, never wearing the corner away past the center. Always wear toward the center, and not from it. Do nearly all the cutting with the end corners of scrapers, using the scraper crosswise, as shown at 92′ of Fig. 19, only in nearing a finish. A few trials will afford the necessary experience.

Having thus fully described this invention, what I claim as original and desire to protect by Letters Patent is,

1. In a wheel refacing machine, hollow scraping stones held with end corners or side corners in cutting contact with revolving wheel, carriage provided with traverse and longitudinal travel to carry said scraping stones, said carriage provided with clamping bolt and plate having backward extension containing screw for adjusting plate to thickness of scraping stones, elevation of part of carriage material beneath said adjustment screw to receive pressure of same and threaded to receive the traverse feed screw in direct line with the pressure of same against the scraping stones in action, combination hand wheel and nut, for use with hand or wrench, to turn said traverse feed screw, traverse carriage slidably mounted upon and between diagonal walls of that portion of carriage base, said carriage base having lateral projections at its place of sliding contact with the two slide bars upon which said carriage thus singularly specified may be mounted to operate in duplicate upon opposite sides of same, all as herein shown in combination with other members.

2. In a machine for the purpose herein stated, two supporting brackets, each with a stationary base member having an adjustable secondary member clamped against it by bolts passing through vertical slots in one member and horizontal slots in the other member, said base member having screws threaded into projections from its upper and end portions to engage the upper and end portions of the said secondary member, said secondary member having screws threaded into projections from its lower portion to engage another lower projection from the vertical portion of the base member through which lower projection the base may be bolted to its foundation, said secondary member provided with a concave upper portion and clamp band screwed to same for engagement and rotary adjustment with the circular end attachment of the body of machine, all in combination with other members as herein shown and specified.

3. In a machine for truing faced wheels and pulleys, two detachable end brackets each with a single clamp band and concave solid member forming a circular clamp, two end supporting rings for engagement with said circular clamps, said rings each comprising two semicircular members with bars forming the chord of each semicircle, said bars provided with bolts through both to clamp the semi circles together in their determined position, and provided with recesses in each to fit the bar members, upon which said rings are clamped; parallel slide bars of square or multiangular shape arranged with one of the vertices of each bar turned toward that of the other bar at the point of their nearest approach, cross connecting bars fastened to and joining the ends of the said parallel bars, said cross connecting bars being provided with holes into which are journaled a longitudinal feed screw, holes into which are attached a rod parallel to said feed screw, and holes into which are fastened studs, one in each bar equally distant from said feed screw, all in combination with other members of machine as herein shown and specified.

4. In a wheel scraping device, hollow stones clamped upon the duplicate traverse carriages mounted upon their respective carriage bases operating in pairs slidable upon two parallel slide bars with means for clamping same thereon, four side projections from each carriage base joined to those of the opposite carriage base in pairs by screws uniting same to form four V shaped guides against the inner extremities of said slide bars, twin member end supporting rings clamped at or near the ends of said slide bars with ample space between said twin members of said end rings to allow the free passage of said V shaped guides thus permitting the carriage bases to move close up to said end rings, an end ring clamping bracket at each end of machine, having a concave member with a single clamping band and screws to bind same upon said end rings, also a base member to which the concave member is adjustably fastened, all as herein specified.

5. In a wheel refacing attachment, two end supporting brackets arranged to be clamped for rotary adjustment upon two removable twin member end supporting rings securable at desired distances apart upon parallel slide bars, with substantial cross connecting bars, twin carriage members jointly operating upon opposite sides of said slide bars being longitudinally slidable upon same by means of a longitudinal feed screw journaled into said cross bar, twin member feed nuts operating together on opposite sides of said carriage upon said longitudinal feed screw with means of holding said feed nuts in their relative positions against said carriage, a rod parallel to said longitudinal feed screw carrying detachable stop blocks to limit travel of said carriage by collision of said feed nuts with said stop blocks, a pair of cog gears and extensible crank to work together and interchangeably upon either end of said longitudinal feed screw and upon a stud in either cross connecting bar, said cog gears provided with clutch for engagement with said crank, means of extending said crank lever for twice as many changes of leverage as are holes therein for fastening reversibly upon the crank sleeve, all as herein shown and described.

6. In a scraping machine for truing worn band mill wheels and other similar work, one or more hollow scrapers of hard abrasive material clamped upon one or more traverse carriages operated separately or together with means for traverse and longitudinal travel, means for limiting said longitudinal travel of carriage members by collision of feed nut against a set stop block, means of varying the speed of feed screw and of facilitating the labor of turning same by interchangeable gears and extensible handle crank, means of fastening the machine to foundations wider apart or closer together by the removable clamping end ring supports which encircle the outer extremities of the carriage slide bars, means of setting the scraping stones to any part of a band wheel with correct rotary position, and of setting the supporting brackets to suitable fastenings in any plane or angle of position by the rotary contact of the bracket clamp band and concave bracket member upon said end ring support, and means of varying the lateral and horizontal adjustments of the entire machine by temporarily releasing the bolts which pass through the vertical and horizontal slots in said bracket members, then by using the adjustment set screws, all as herein shown and described.

WILLIAM RICHARD ANTHONY.

Witnesses:
 WALTER GOODMAN,
 THOMAS SMITH.

Copies of this patent may be obtained for five cents each, by addressing the "Commissioner of Patents. Washington, D. C."